US006668554B1

(12) United States Patent
Brown

(10) Patent No.: US 6,668,554 B1
(45) Date of Patent: Dec. 30, 2003

(54) GEOTHERMAL ENERGY PRODUCTION WITH SUPERCRITICAL FLUIDS

(75) Inventor: Donald W. Brown, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/393,397

(22) Filed: Sep. 10, 1999

(51) Int. Cl.$^7$ .............................................. F03G 7/00

(52) U.S. Cl. ..................................... 60/641.2; 60/641.4

(58) Field of Search ........................... 60/641.2, 641.4; 165/45

(56) References Cited

U.S. PATENT DOCUMENTS

| | | | | |
|---|---|---|---|---|
| 3,640,336 A | * | 2/1972 | Dixon ............................ | 165/1 |
| 3,786,858 A | | 1/1974 | Potter et al. .................... | 165/1 |
| 4,060,988 A | | 12/1977 | Arnold ........................ | 60/641 |

(List continued on next page.)

OTHER PUBLICATIONS

Brown, D., "The US Hot Dry Rock Program—20 Years of Experience in Reservoir Testing," Proceedings of the World Geothermal Congress 1995, vol. 4, Florence, Italy, May 18–31, 1995.

Brown, D. W. "Summary of Recent Flow Testing of the Fenton Hill HDR Reservoir," Los Alamos National Laboratory publication LA–UR–94–2856, submitted to Stanford Geothermal Reservoir Engineering Workshop, (1994).

Brown, D. W., "How to Achieve a Four–Fold Productivity Increase at Fenton Hill," Geothermal Resources Council Transactions, vol. 18, pp. 405–408, (Oct. 1984).

Brown, D.W., "A Hot Dry Rock Geothermal Energy Concept Utilizing Supercritical CO2 Instead of Water as the Work Fluids," Abstract, pp. 1–10, submitted Jan. 3, 1999 to World Geothermal Congress 2000 to be held May 29, 1999 to Jun. 10, 2000 at Kyushu and Tohoku, Japan.

Brown, D., DuTeaux, R., "Three Principal Results from Recent Fenton Hill Flow Testing," Proceedings, Twenty–First Workshop on Geothermal Resevoir Engineering, Stanford University, Stanford, CA, pp. 185–190, (Jan. 27–29, 1997.

Brown, D. DuTeaux, R. Kruger, P., Swenson, D. Yamaguchi, T. "Fluid Circulation and Heat Extraction from Engineered Geothermal Reservoirs," Geothermics 00, pp. 1–20, (1999).

DuTeaux, R., Brown, D., "HDR Reservoir Flow Impedance and Potentials for Impedance Reduction," Proceeding, Eighteenth Workshop on Geothermal Reservoir Engineering, Stanford University, Stanford, CA, pp. 193–197, Jan. 26–28, 1993.

Saito, S., Sakuma, S. Uchida, T. "Drilling Procedures Techniques and Test Results For a 3.7 km Deep, 500°C Exploration Well, Kakkonda, Japan," Geothermics vol. 27, pp. 573–590, (1998).

Shyu, G., Hanif, N., Hall, K., Eubank, P., "Carbon Dioxide–Water Phase Equilibria Results from the Wong–Sandler Combining Rules," Fluid Phase Equilibria 130, pp. 73–85, (1997).

(List continued on next page.)

Primary Examiner—Hoang Nguyen
(74) Attorney, Agent, or Firm—Gemma Morrison Bennett

(57) ABSTRACT

There has been invented a method for producing geothermal energy using supercritical fluids for creation of the underground reservoir, production of the geothermal energy, and for heat transport. Underground reservoirs are created by pumping a supercritical fluid such as carbon dioxide into a formation to fracture the rock. Once the reservoir is formed, the same supercritical fluid is allowed to heat up and expand, then is pumped out of the reservoir to transfer the heat to a surface power generating plant or other application.

29 Claims, 4 Drawing Sheets

U.S. PATENT DOCUMENTS

| | | | | |
|---|---|---|---|---|
| 4,142,108 A | | 2/1979 | Matthews | 290/1 R |
| 4,326,581 A | | 4/1982 | Rapier | 165/45 |
| 4,341,077 A | | 7/1982 | Woinsky | 60/641.3 |
| 4,357,802 A | | 11/1982 | Wahl et al. | 60/641.5 |
| 4,380,903 A | | 4/1983 | Matthews | 60/641.4 |
| 4,426,849 A | | 1/1984 | Matthews | 60/641.4 |
| 4,765,143 A | * | 8/1988 | Crawford et al. | 60/671 |
| 5,024,276 A | * | 6/1991 | Borchardt | 166/308 |
| 5,676,737 A | | 10/1997 | Whitlock | 95/90 |
| 5,771,984 A | * | 6/1998 | Potter et al. | 175/14 |
| 5,911,684 A | * | 6/1999 | Shnell | 60/641.2 |

OTHER PUBLICATIONS

Tihanyi, L. and Bobok, E., "A New Way of Heat Recovery: CO2 as a Geothermal Fluid" Geothermal Resources Council Transactions, vol. 22, pp. 499–502, Sep. 2–23, 1998.

Vukalovich, M. P., Altunin, V. V., "Thermophysical Properties of Carbon Dioxide," Collet's (Publishers) LTD., London & Wellingborough (1968).

Yost, A. B., Mazza, R. L., Remington, R. E. II, "Analysis of Production Response to $CO_2$/Sand Fracturing: A Case Study," SPE 29191, pp. 297–303, Nov. 8–10, 1994.

Yost, A. B., Mazza, R. L., Gehr, J. B., "$CO_2$/Sand Fracturing in Devonian Shales," SPE 26925, pp. 353–362, Nov. 2–4, 1993.

Program Announcement to DOE National Laboratories, "Greenhouse Gas (GHG) Sequestration Applied Research", Federal Energy Technology Center, Aug. 02, 1999.

"Final Technical Report, DSA of the Microcracks in More ST–2 Core, Interpretation and Implications", Nov. 16, 1977.

* cited by examiner

GEOTHERMAL ENERGY PRODUCTION WITH SUPERCRITICAL FLUIDS

This invention was made with government support under Contract No. W-7405-ENG-36 awarded by the U.S. Department of Energy. The government has certain rights in the invention.

TECHNICAL FIELD

This invention relates to a method and apparatus for geothermal energy production from hot dry rock reservoirs using supercritical fluids.

BACKGROUND ART

There have been developed various methods of extracting heat from dry geothermal (hot dry rock) reservoirs, such as that described in U.S. Pat. No. 3,786,858 (Potter, et al, Jan. 22, 1974). These methods rely upon water to hydraulically fracture formations to form the reservoirs.

Once a fractured reservoir has been formed, production wells are drilled to intersect the hot dry rock reservoir. Then water, used as the geofluid, is pumped into the reservoir through the injection well which was previously used for hydraulic fracturing during reservoir formation. The water flows across the fractured surfaces of the hot dry rock, is heated by contact with the hot rock, and then is used to transfer the geothermal heat to the surface by flowing upward through one or more production wells in a pressurized, closed-loop circulating operation referred to as heat mining.

At the surface, the heat contained in the circulating geofluid is transferred to a second fluid, referred to as a binary working fluid, in a high-pressure heat exchanger of conventional design, and then the cooled geofluid reinjected into the hot dry rock reservoir. This second fluid, which can also be water, is more commonly ammonia, or one of a class of halogenated hydrocarbon refrigerants such as the Freons™, or one or a mixture of low molecular weight hydrocarbons such as isobutane or isopentane.

In common practice, even though the hot pressurized geofluid is relatively benign chemically, it is not flashed to steam at the surface because of the release to the environment of small amounts of environmentally undesirable dissolved materials such as hydrogen sulfide, boron, arsenic, fluorides and other trace minerals in the aqueous geofluid. More significant quantities of silica, chlorides, and carbonates are also typically dissolved in the aqueous geofluid, potentially causing corrosion and undesirable deposits on turbine blades and other metallic surfaces in power plants and in heat exchangers.

Water-based geothermal systems generally have a geochemically determined temperature limit controlled by the critical point of water (384° C. and 22 MPa). As the critical point for water is reached and then surpassed, the enhanced dissolution of silica followed by retrograde precipitation above 384° C. presents a substantial obstacle to operating a hot dry rock geothermal reservoir at higher than the critical temperature for water. For hot dry rock reservoirs created in the most common igneous and metamorphic rocks and mixtures of the most common igneous and metamorphic rocks, where silica is present as either a primary or secondary (i.e., fracture-filling) mineral, the silica dissolution and reprecipitation problem occurs as the critical temperature for water is exceeded. Although drilling systems are capable of reaching rock temperatures in excess of 400° C., concerns about enhanced geochemical interactions arise in water-based hot dry rock geothermal energy systems at these temperatures.

Because of the excellent inorganic solvent properties of water and because of the slow diffusional flow of water through the microcrack porosity in underground reservoirs, it is often difficult to control the chemistry of the water used as the production geofluid.

Thus, there is still a need for improved methods of producing hot dry rock geothermal energy.

Therefore, it is an object of this invention to provide another method for production of geothermal energy.

It is another object of this invention to provide a method of producing geothermal energy with supercritical fluids.

It is a further object of this invention to provide a method of producing geothermal energy with supercritical carbon dioxide.

It is still another object of this invention to provide a method of producing geothermal energy with improved control of the geofluid chemistry.

It is yet another object of this invention to provide a method of sequestering carbon dioxide in deep rock formations.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. The claims appended hereto are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a method for producing geothermal energy from deep regions of hot, essentially dry rock using fluids other than water for creation of underground reservoirs, production of geothermal energy, and, optionally, as working fluids in power plants. Underground reservoirs are created by pumping a supercritical fluid such as carbon dioxide into a rock mass to fracture the rock. Once the confined geothermal reservoirs are formed, the same supercritical fluids are circulated into the geothermal reservoirs, are allowed to heat up and expand, and then are pumped out of the reservoir to transport the heat to surface power generating plants or other direct heating applications.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

BEST MODES FOR CARRYING OUT THE INVENTION

Figure 1:
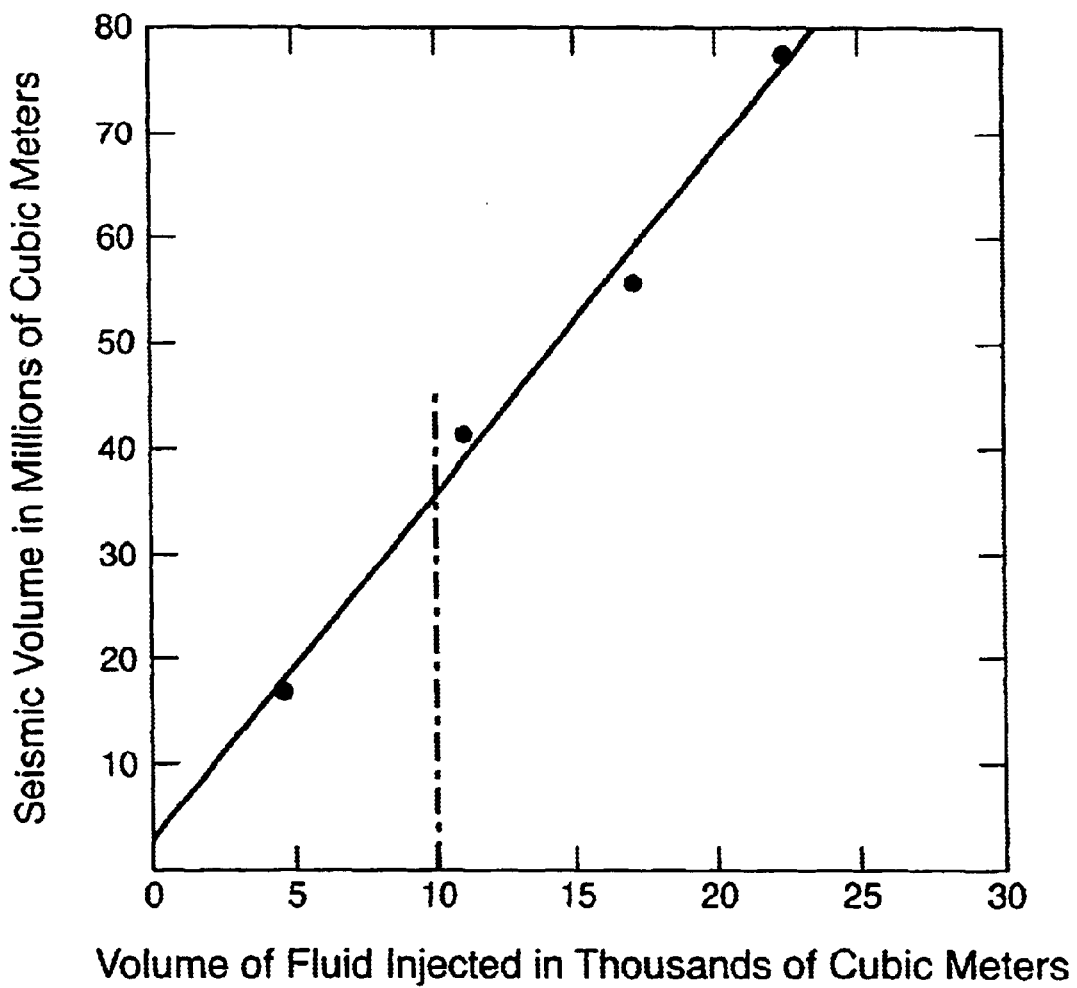
FIG. 1 is a graph of the relationship of amount of injected fluid to reservoir volume.

It has been discovered that geothermal energy can be produced from confined dry geothermal (hot dry rock)

reservoirs using selected supercritical fluids. In accordance with the present invention, a supercritical fluid is used as a fracturing fluid and heat-transport fluid for deep earth heat-mining systems, and, if desired, as the working fluid for surface power generating plants.

The hot dry rock reservoir is created by hydraulically fracturing a deep region of igneous or metamorphic rock or a deep region of limestone or other sedimentary rock using a supercritical fluid as the fracturing fluid. Generally, best results are expected from fracturing deep regions of essentially impermeable, hot, basement crystalline rock below sedimentary rock layers. It is contemplated that the invention will work well in deep crystalline rock formations such as granite, granodiorite, diorite, mafic igneous rocks, metamorphic equivalents of any of these, or other crystalline rocks.

For fracturing the formation to form the hot dry rock reservoir, one or more injection wellbores are drilled by any suitable method known in the art. A single injection wellbore is generally adequate. At least one interval of at least one openhole wellbore is packed off at the selected depth. Depths are selected to reach a level where there is sufficient heat in the rock to make successful, cost effective thermal production practical. Generally, depths in the range from about 1,000 feet (below surface debris and sediments and sedimentary rocks) to about 30,000 feet can be used, depending upon underground thermal conditions.

Underground rock temperatures anywhere from about 120° C., below which thermal production would not be cost effective, to about 1,000° C. or more, with the limitation being the ability to handle the high temperatures with present well drilling and completion equipment and materials. Generally, underground rock temperatures in the range from about 150° C. to about 500° C. are considered more useful in the invention methods.

Pressurized supercritical fluid is pumped from the surface into the injection wellbore by any convenient means such as with a postive displacement or centrifugal pump. The supercritical fluid is injected into the packed-off interval of an openhole wellbore using any suitable means such as a high-pressure tubing string.

Injection periods from a few hours to several months may be required for creating the reservoir region, depending upon the characteristics of the in situ stress field, the extent and orientation of fractures and joints already existing in the rock mass to be fractured, the resistance to flow in the network of interconnected fractures, the orientation of joint sets in the region to be fractured, and, most importantly, upon the desired size of the confined reservoir to be created. Generally an injection period in the range from about week to about three months is adequate.

Generally, pumping rates in the range from about 20 to about 60 kg/s are presently preferred, depending upon the actual formation injection pressure in the packed-off wellbore inerval, because of pressure and flow capabilities of commercially available pumping equipment. Surface pumping pressures in the range from about 1,000 psi to about 15,000 psi are generally sufficient to fracture most formations. When carbon dioxide is used as the supercritical fluid, then pressures in the range from about 1,100 to about 10,000 psi are generally useful in the invention method because of the 1073 psi (7.40 MPa) critical pressure for carbon dioxide.

Initially, as the pressure in the packed-off interval is rapidly increased, one or more of the more favorably oriented natural joints intersecting the wellbore starts to open under a combination of tensile (hoop) stresses at the wellbore surface and normal opening stresses from fluid invasion into the hydrothermally sealed natural joints (which are somewhat more permeable than the adjacent unjointed rock). In a region where the natural fractures in the rock are predominantly vertical, lower pumping pressure is generally necessary than if the pre-existing fractures or joints in the rock are predominantly inclined from the vertical. As pumping continues, the natural fractures or joints progressively open and interconnect, forming a multiply connected region of pressure-dilated joints in the rock mass surrounding the packed-off wellbore interval, thus creating the fractured hot dry rock reservoir region.

The fracture volume of the reservoir can be as much as ten times or more greater than the original microcrack pore volume of the unfractured rock formation. Confined reservoir regions as large as a cubic kilometer or more can be made by hydraulic fracturing with supercritical fluids, depending upon how long and at what rate pressurized supercritical fluid is pumped into the formation during fracturing of the rock. When carbon dioxide, with a density about equal to that of water, is used as the supercritical fluid, about a cubic meter of supercritical fluid will open up about 4,000 cubic meters of reservoir, as shown in FIG. 1. FIG. 1 is a graph showing the linear relationship between reservoir volume and volume of injected fluid as determined from microseismic event location data in a test of a region stimulated by injecting fluid under high pressure.

Supercritical fluids which can be used in the practice of the invention include, but are not limited to, carbon dioxide, halogenated hydrocarbon refrigerants such as Freons™, arnmonia, mixtures of ammonia and water, low molecular weight hydrocarbons such as propanes, butanes and hexanes, and mixtures thereof.

Supercritical carbon dioxide, halogenated hydrocarbon refrigerants, hydrocarbons and mixtures thereof are more preferred than ammonia and mixtures of ammonia and water because of the corrosive properties of supercritical ammonia and the possibility of vigorous, exothermic reactions of supercritical ammonia and water mixtures.

Carbon dioxide is generally presently most preferred as the supercritical fluid because it is readily available, easily handled, economical, generally chemically inert, and accepted by the public as nonhazardous. Using carbon dioxide as the geofluid has the additional advantage of providing a way to sequester carbon dioxide from flue gases or other industrial process effluents by using and maintaining the carbon dioxide deep in the earth and allowing a portion of it to slowly diffuse into the surrounding rock mass.

Additives can be incorporated into the supercritical fluid before introduction into the injection borehole or can be added to the circulating fluid anywhere convenient in the flow path of a closed-loop system. Additives can be employed for inhibition of corrosion of casing, piping, pumping equipment, and power generation plant equipment such as heat exchangers. Additive amounts of other fluids can be used to adjust the physical and thermodynamic properties of the fluid, such as the density, or the critical pressure and temperature of the supercritical fluid. Additive amounts of water can be used in supercritical ammonia for the same purposes.

Figure 2:
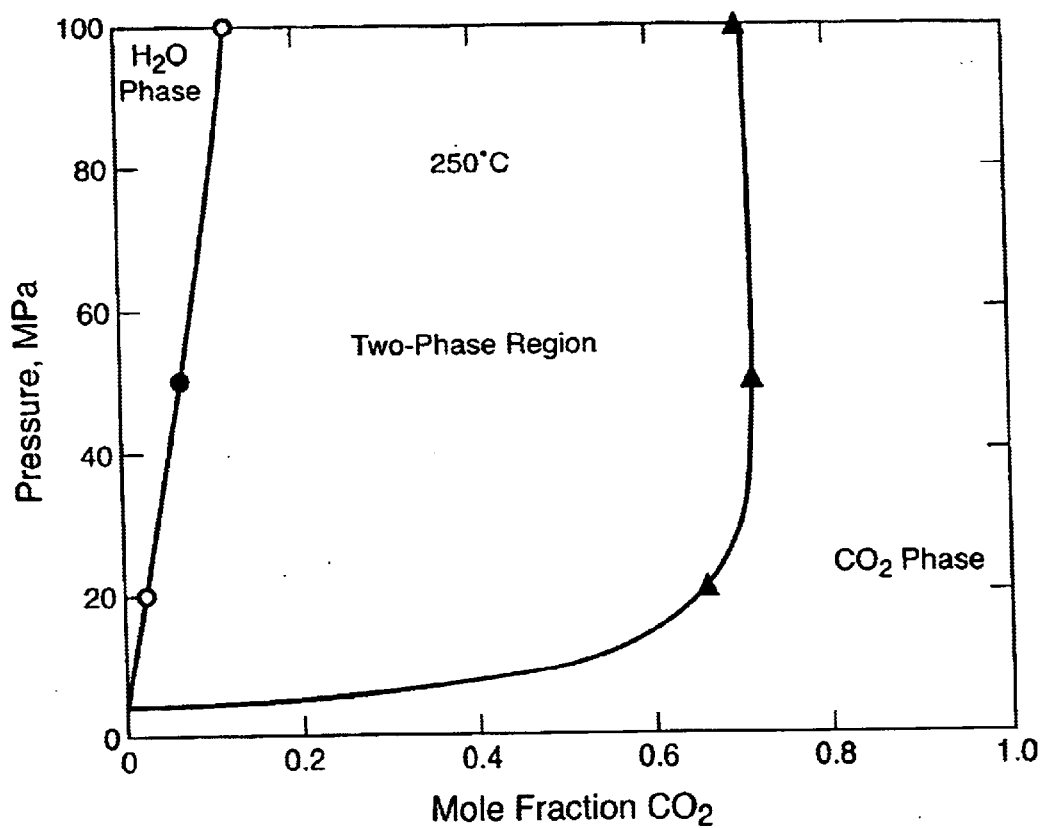
FIG. 2 is a graph of solubility of water in carbon dioxide at 250° C. as a function of pressure.

During hydraulic fracturing using supercritical carbon dioxide, almost all of the original naturally occurring pore fluid (generally a brine) present in the microcrack porosity of the fractured reservoir is dissolved in the amount of supercritical fluid used to create the reservoir. For a typical hot dry rock reservoir at a depth of 4 km and for a rock temperature of 260° C., and assuming a reasonable surface injection pressure of 30 MPa (fluid conditions of 67 MPa and 250° C. within the reservoir), at least a 24 mol percent solubility of water in the supercritical carbon dioxide can be anticipated. FIG. 2 shows the solubility of water in supercritical carbon dioxide at 250° C. as a function of the pressure of the solution.

When carbon dioxide is used as the supercritical fluid, the mineral constituents originally dissolved in the initial pore fluid within the reservoir are left behind as mineral precipitates when the pore fluids in turn dissolved by the supercritical carbon dioxide, since these minerals such as silica and chlorides are generally not soluble in the supercritical carbon dioxide.

If the hot dry rock reservoir is being created in sedimentary rock or other formations which contain methane and other hydrocarbons, and if carbon dioxide or another fluid which dissolves hydrocarbons is used as the supercritical fluid, then it may be necessary to incorporate a separation step when the supercritical fluid is first circulated back up to the surface. Separation of the hydrocarbons from the supercritical fluid can be accomplished using any conventional method such as separation with propylene carbonate membranes or by chilling the mixture to distill out the hydrocarbons.

At the periphery of the hot dry rock fractured reservoir region of the rock mass, the supercritical fluid slowly diffuses outward to the much-lower-pressure far field from the pressurized reservoir. If carbon dioxide is used as the supercritical fluid, the pre-existing water-filled network of interconnected microcracks in the surrounding rock mass is slowly flushed with the supercritical fluid, and the pore fluid is dissolved, leaving behind mineral precipitates which tend to partially plug the microcrack porosity and slowly seal the reservoir boundaries.

After the desired volume of rock is fractured (i.e., pressure stimulated), the pressure of supercritical fluid being injected is reduced to a pressure at which the system is stabilized with no further fracture extension, i.e., no more rock is being fractured at the periphery of the reservoir and, therefore, the reservoir is no longer being enlarged. In this manner a large region of fractured rock bounded by surrounding almost-impermeable unfractured rock is created—the confined hot dry rock reservoir.

For production of thermal energy from the hot dry rock reservoir, one or more production wellbores are drilled into the fractured zone using any suitable drilling method. Since the deep earth stress field is normally anisotropic, the pressure-stimulated reservoir region will tend to be elongated in some direction, but still symmetrical about the injection well that was used to create the fractured region that is the reservoir. Therefore, in almost all cases it will be preferred to access the reservoir with a plurality of production wells. For example, in ellipsoidal-shaped hot dry rock reservoirs, production wells could be drilled at each end furtherest from the injection well. Generally presently preferred are two production wells drilled to penetrate the reservoir near either end of the elongated region. This three-well (one injection, two production) strategy usually is most cost effective. An example of this is shown in the schematic of FIG. 3.

Figure 3:
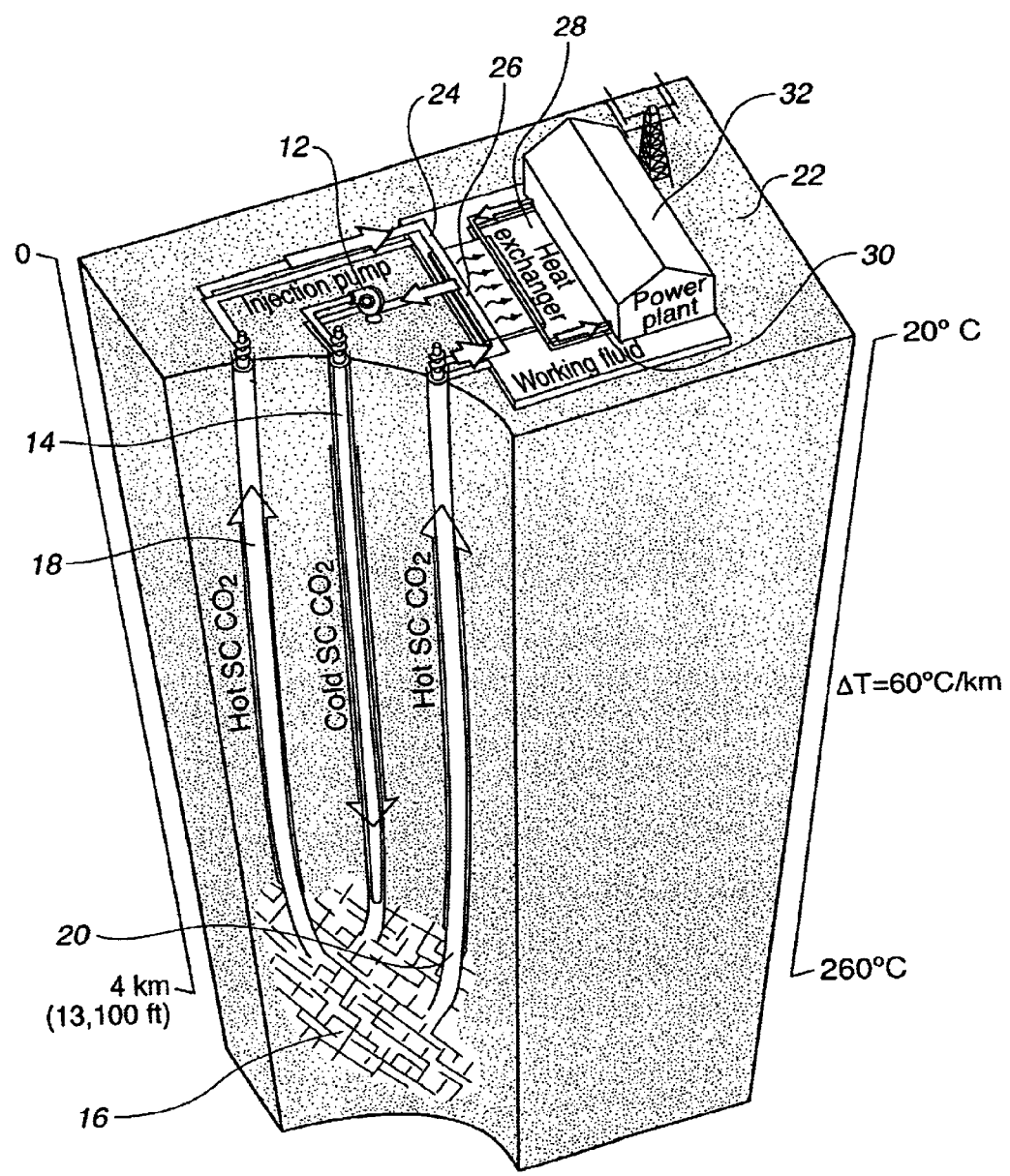
FIG. 3 is a schematic of a set up for production of geothermal energy in accordance with the invention.

In the schematic of FIG. 3 fluid is pumped by injection pump 12 into a single injection well 14 into a reservoir region 16. Pressure and supercritical fluid from the reservoir region 16 circulates up one of two production wells 18 and 20 to the surface 22 where the supercritical fluid is circulated through conduits 24 and 26 back to the injection pump 12 which pumps the fluid back down the injection well 14. A portion of the conduits carrying the heated supercritical fluid from downhole passes through a heat exchanger 28 where heat is transferred to conduits 30 carrying a power plant 32 working fluid.

In a typical production process in accordance with the invention, following the drilling of one or more production wells, pressurized supercritical fluid is re-injected into the reservoir through at least one injection well. The same wellbore used to fracture the rock to form the reservoir is generally used as the injection wellbore. Initially, sufficient supercritical fluid to re-pressurize the reservoir, to establish circulation, and to make up for supercritical fluid diffusing into the rock mass surrounding the reservoir region, is introduced into the injection well.

After formation of the reservoir, an initial period of water separation from the supercritical fluid may be used as needed, especially in closed loop systems, to eliminate from the system water brought up from the reservoir region dissolved in the supercritical fluid or in another phase. Once the amount of water coming out of the reservoir is reduced to a very small amount, the need for corrosion inhibition measures during geofluid circulation is virtually obviated.

When desired, because total reservoir flow is dependent primarily on the near-production-wellbore flow impedance, additional lateral production wells can be used. Generally, two additional lateral production wells, one off of each of two initial near-vertical production wells, would be used. This arrangement could approximately double the production flow rate, and therefore the thermal power output, for the total cost of one additional well since each lateral leg costs about 50% of the cost of an initial wellbore.

When carbon dioxide is used as the supercritical fluid in the practice of this invention, the carbon dioxide remains in the supercritical phase in the reservoir because of the elevated pressure. If other fluids such as ammonia, low molecular weight hydrocarbons or halogenated hydrocarbon refrigerants are used as the geofluid, the fluid is pumped into the injection well as a compressed liquid and may then change from the liquid to the supercritical phase when subjected to the elevated downhole temperatures.

The supercritical fluid is heated by transfer of energy from the hot rock surfaces it comes into contact with in the reservoir. As the supercritical fluid is heated it expands to some extent, losing density.

The very significant difference in the density of the cold injected supercritical circulating fluid in the injection wellbore (which can be as much as about 1.0 g/cc for carbon dioxide) and the density of the hot produced circulating fluid in the production wellbore or wellbores (which can be as little as about 0.3 g/cc for carbon dioxide) provides an impressive bouyant drive or thermal siphoning of the geofluid which greatly reduces the required circulating pumping power compared to that required for geofluid circulation in a comparable water-based hot dry rock geothermal energy system.

An amount of supercritical fluid sufficient to achieve an appropriate level of reservoir pressurization and then sufficient to establish and maintain reservoir circulation by the thermal siphoning of the supercritical fluid circulating through a closed-loop system is pumped down at least one injection well into the reservoir region. Depending upon what demands are made on the fluid circulation system at the surface, the thermal siphoning may be adequate to keep the fluid circulating indefinitely without much pumping assistance at all. For example, if the supercritical fluid is circulated by itself in a closed loop back down the injection well as would be done in a binary power generating system, the supercritical fluid could be circulated with minimal or no need for additional pumping. With the exception of very minor losses of pressure through surface heat exchangers used to transfer geothermal heat to binary cycle working fluids, the pressure of the hot supercritical fluid thermally siphoned out of the reservoir would be equal to the injection pressure for the cold supercritical fluid. Conversely, if the supercritical fluid is pumped directly into an expansion turbine without use of heat exchange equipment, then pumping assistance would be required for reinjection at the surface.

Additional supercritical fluid is used for fluid makeup at the surface to compensate for the small amount of supercritical fluid slowly diffusing into the rock mass surrounding the pressurized hot dry rock reservoir region.

Fluid makeup with pure supercritical fluid combined with an initial period of water removal, eventually reduces the amount of dissolved water in the circulating supercritical fluid to a very small amount. This eliminates the need for any water separation equipment in the surface power plant following one initial pre-production reservoir diagnostic phase lasting a few months.

Any supercritical carbon dioxide escaping the system is relatively harmless since it is essentially nonhazardous in dilute concentrations.

Surface conduits of a kind and configuration known in the art are used to convey the heated supercritical fluid from the well head to any of a variety of applications which require thermal energy. Presently contemplated, in addition to surface electric power generating plants, are applications such as space heating, preheating materials for chemical processes, drying pumice and minerals mined in a way that produces wet products, heating greenhouses, drying crops, heating water, and for any other direct-heat application requiring a moderate-temperature hot fluid.

There are at least two different approaches that can be used when the heated supercritical fluid is used for power generation: conventional binary-cycle turbine power generation and direct drive of a turbine with the heated supercritical fluid.

In a first approach, a binary heat transfer system method could be used to achieve superior thermodynamic efficiency (approximately a factor of 3 higher heat utilization rate than in a direct-expansion turbine method), particularly when carbon dioxide is the circulating supercritical fluid. In this alternative, isobutane, a halogenated hydrocarbon refrigerant, liquid ammonia or another suitable binary-cycle working fluid is circulated through a heat exchange system where it is heated by the hot supercritical geofluid circulated up from the reservoir. Then, in turn, the heated binary-cycle working fluid is used to provide heat energy to the turbine. The binary-cycle working fluid is pumped under pressure into a heat exchanger or boiler in contact with the heated supercritical geofluid where the binary-cycle working fluid is vaporized. The expanding vapor spins the turbine while losing pressure and temperature, and is then circulated through a cooling tower where it is condensed to the liquid phase. The liquid phase binary-cycle working fluid is pumped back into the heat exchanger where it is once again heated and vaporized by the circulating geofluid.

In a second approach, the hot circulating geofluid from the production wellbore or wellbores can be expanded directly into a power generating turbine, since there are essentially no dissolved solids in the circulating geofluid. In the power generating turbine, the supercritical fluid (carbon dioxide is presently preferred) expands isentropically to a lower temperature and pressure. Then, after a significant amount of heat rejection (cooling) at constant pressure, the dense, cooled but still supercritical fluid is reinjected into the confined hot dry rock reservoir. Pumping is generally required for circulation of the geofluid through a closed loop system using this approach.

In this direct introduction of the geofluid into the turbine, the inability of supercritical fluids to dissolve and transport mineral constituents from the geothermal reservoir to the surface would eliminate mineral scaling effects in the surface piping and power plant equipment. Using halogenated hydrocarbon refrigerants or hydrocarbons as the supercritical fluid would prevent corrosion of equipment which could occur if small amounts of water were dissolved in supercritical carbon dioxide, forming carbonic acid which would react with metals.

This second approach eliminates the need for primary heat exchangers or surface fluid cleanup or gas separation systems as used in conventional binary-cycle geothermal power plants. Cooling towers or air-cooled heat exchangers are used as needed for heat rejection from the turbine outflow, where the supercritical fluid is expanded directly in the power-generating turbine.

Although it is not necessary in either of the two approaches to power generation using hot dry rock geothermal energy, to recycle the cooled supercritical fluid from the power generation plant back down the injection well or wells in a closed-loop system, that is the presently preferred mode of operation because it conserves the geofluid (and its pressure in the binary-cycle mode) and prevents environmental effects that could result from releasing the geofluid into the-atmosphere. This would be particularly so if the fluid were a flammable hydrocarbon, a halogenated hydrocarbon refrigerant, or ammonia.

Problems associated with traditional geothermal reservoir operation temperatures being limited by the critical point for the water (384° C. and 22 MPa) used as a circulation fluid are not encountered with use of supercritical carbon dioxide as the production fluid because the supercritical carbon dioxide is not a solvent for the inorganic materials found in igneous and metamorphic rocks. Thusly, the potential problems associated with dissolved minerals and other materials are avoided. This allows for supercritical-fluid-based hot dry rock production temperatures approaching 400° C. or even higher, with the ultimate temperature generally being determined by the temperature limits of the drilling system.

When the relatively small amount of pore fluid originally in place in the deep basement rock is dissolved in the supercritical carbon dioxide, its dissolved mineral constituents are left behind as a small amount of mineral precipitate within the microcrack pore structure. Therefore, problems in water-based geothermal energy production systems associated with other trace materials in solution such as arsenic, fluoride and boron are avoided by use of supercritical carbon dioxide as the production fluid.

Indeed, when the dissolved mineral constituents are left behind as precipitates, the precipitates tend to slowly plug off the microcrack porosity at the periphery of the hot dry rock fractured region, slowly sealing the reservoir boundaries even more completely than the usually almost impermeable range of several hundredths of a microdarcy. Therefore, the slow outward diffusion of supercritical carbon dioxide from the periphery of the hot dry rock fractured region to the far field from the pressurized reservoir is further slowed.

Engineered hot dry rock reservoirs are inherently confined reservoirs. The chemistry and nature of the circulating fluid can be specified by the operator because there is a minimum of fluid leakoff from the hot dry rock reservoir region after an initial start-up period. Thus, only a small percent of the circulating fluid is lost to fluid leakoff from the periphery of the hot dry rock reservoir.

The engineered reservoirs of this invention have other important advantages over naturally occurring reservoirs. The developer can specify the reservoir operating conditions. The geofluid injection pressure and temperature, and the geofluid production pressure can be tailored to accomplish the production goals while accommodating naturally occurring conditions. The size of the hot dry rock reservoir is determined by the operator through the selection of the rate and duration of fluid injection during reservoir creation by hydraulic fracturing. The expected production temperature is selected by choice of reservoir depth (and therefore rock temperature).

In accessing the fractured reservoir region, the operator has a choice as to the optimum production strategy, based upon both production engineering and financial considerations. Conventional means of productivity enhancement can be used with the supercritical critical carbon dioxide geothermal production methods of this invention. For example, multilateral production wells can be drilled and used. Several methods of production well flow impedance reduction can be employed. These include methods such as repeated pressure and temperature cycling of the near-production wellbore network of flowing fractures or use of chemical means to selectively dissolve certain of the constituent minerals occurring along the fracture surfaces.

Because the invention hot dry rock reservoirs are engineered rather than naturally occurring, other operating options are available. For example, if the reservoir were to be operated at an injection pressure just above the fracture extension pressure, then the reservoir region could be continually grown in a very controlled manner while providing an additional increment in power production because of the increased level of injection pressure and, therefore, a reduction in the overall reservoir flow impedance. In addition, the amount of carbon dioxide sequestration would increase accordingly. If carefully controlled, this slow reservoir growth could effectively double the size of the hot dry rock reservoir in a decade. At that time a slow drop in the production temperature would be anticipated if the production strategy had been well planned. In a reservoir that had been grown in this manner over a decade, the production well or wells could then be converted into injection wells and more production wells drilled further away from the original injection well site. This would essentially double the lifetime of the hot dry rock heat mine at the cost of drilling only the additional production well or wells while other capital costs had already been substantially amortized.

When supercritical carbon dioxide is used as the geofluid in a hot dry rock geothermal energy system, the invention can make a significant contribution to solving a developing worldwide environmental problem—that of continued global warming due to ever-increasing atmospheric concentrations of carbon dioxide, one of the so-called "greenhouse gases." This contribution by the invention is provided in three ways: (1) by tying up in the geofluid inventory of the closed-loop hot dry rock circulation system a large amount of carbon dioxide that would otherwise end up in the atmosphere; (2) by replacing an equivalent amount of fossil-fueled energy production with clean, nonpolluting hot dry rock geothermal energy; and (3) by sequestering, over time, a very significant amount of carbon dioxide deep in the earth through the diffusion of supercritical carbon dioxide into the rock mass surrounding the fractured hot dry rock reservoir.

To elaborate upon the third point, A hot dry rock geothermal power plant in accordance with the present invention has the capability of continuously sequestering, by diffusion into the surrounding rock mass, about as much carbon dioxide as that produced by a typical coal-fired power plant, considering each on a per MW-electric basis: 24 tons of carbon dioxide per day per MW(e).

Also, with regard to the third point, for certain types of igneous and metamorphic rocks comprising the rock mass, the hot supercritical carbon dioxide diffusing outward from the hot dry rock reservoir region is chemically bound up in the rock by carbonating the contained calcic feldspars (e.g., labradorite or anorthite). That is, for supercritical carbon dioxide diffusing through hot, microcracked felsic or silicic rocks (e.g., granite, granodiorite, diorite or gabbro), the carbon dioxide reacts with the contained calcic feldspars, producing calcium carbonate as a precipitate with clays and other geochemically altered materials. Thus, the outward diffusion of carbon dioxide provides for long-term sequestration, with the carbon dioxide being chemically bound up in the rock mass. This eliminates any environmental consequences from the possible slow leakoff of carbon dioxide from the near-reservoir region to the environment.

The following examples will demonstrate the operability of the invention.

EXAMPLE I

In a constructive reduction to practice using data from an analogous geothermal production system, a confined hot dry rock reservoir is created by fracturing a region of hot, dry igneous Precambrian crystalline rock located at Fenton Hill in the Jemez Mountains of north central New Mexico. Core samples of igneous and metamorphic rock obtained from depths ranging from 1.2 to 2.8 km show that the mean in-situ rock mass porosity is about 0.009% under in-situ stress conditions, and that the corresponding permeability is of the order of 0.1 to 0.01 microdarcies.

Figure 4:
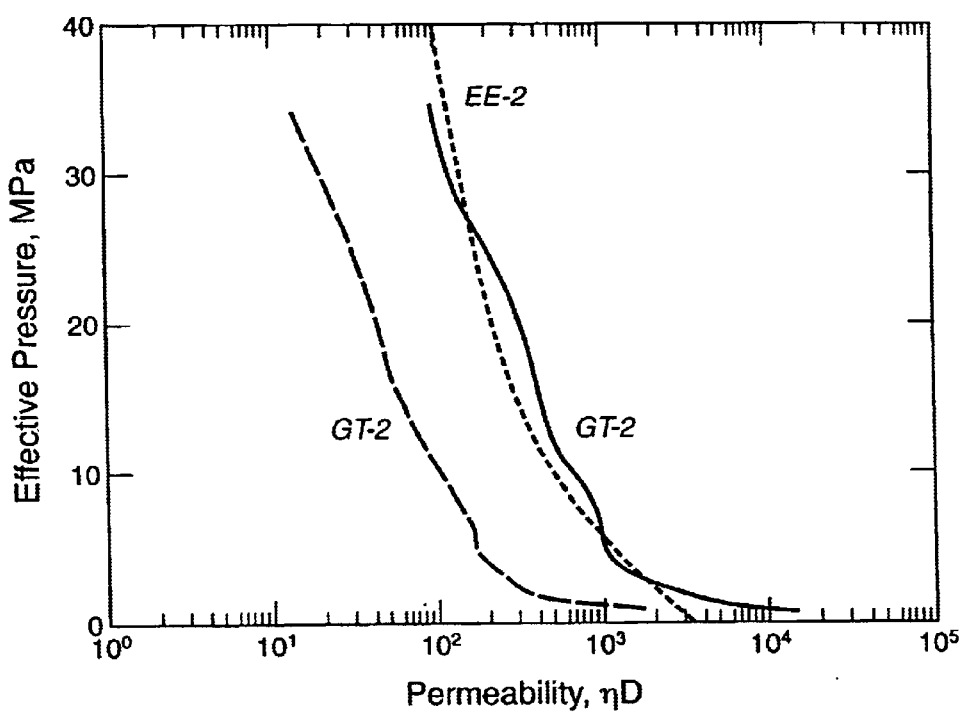
FIG. 4 is a graph of permeability of granitic rock as a function of pressure.

FIG. 4 is a graph of measured permeabilities for three granitic core samples from Fenton Hill relative to the effective pressure.

Following the drilling and completion of a full-diameter deep injection well to a depth of about 4 km, the well is prepared for the subsequent fracturing operation by pressure-isolating the bottom 500 m or so of the uncased wellbore. This is done by installing and cementing in a scab liner about 500 meters off bottom, with a high pressure frac string connecting the liner to the surface. The wellbore and frac string are then purged of all drilling fluid and other water-based fluids by unloading the hole with gaseous carbon dioxide supplied from one or more of a variety of conventional sources, with the carbon dioxide pumped to the bottom of the hole through coiled tubing.

Then, supercritical carbon dioxide is injected from the surface through the frac string and into the pressure-isolated interval of openhole wellbore, using high pressure commercial fracturing pumps. The region being fractured is a pre-jointed body of Precambrian biotite granodiorite centered at a mean depth of 4 km with a temperature of about 260° C.

The rate of injection is maintained at about 50 to 100 pounds per second for a period of several weeks or more, until a suitably large fractured hot dry rock reservoir is created. The desired volume of the fractured reservoir is up to ½ cubic kilometer or more, which requires the injection of about 125,000 cubic meters of supercritical fluid, according to the data shown in FIG. 3. At an injection rate of 100 lb/s, this volume requires a pumping time of about 30 days. The actual injection rate is controlled by maintaining the surface injection pressure at less than 5000 psi, the most economical injection pressure range when using commercial pumping equipment for an extended period of time.

During the entire period of reservoir creation, the growth of the reservoir is monitored microseismically to determine its developing shape and orientation, to allow the determination of the optimum placement for the two (or more) production wells to be subsequently drilled. This is done by recording, with an array of near-surface geophones, the hydraulic-fracturing-induced seismicity generated by shear slippage along the network of pressure-dilating joints within the reservoir region. The array of geophones is emplaced in shallow wells surrounding the injection well.

Two or more production wells are then drilled to optimally access the man-made confined hot dry rock geothermal reservoir. During the latter stages of the drilling of one or more of these production wells, and during a pause in drilling operations, the reservoir is grown an increment larger, again using supercritical carbon dioxide, to allow timely "mid-course" corrections to the drilling trajectories of the production wells.

To determine the need for mid-course corrections, a temporary geophone would be installed at the bottom of the selected production well during the pause in drilling to monitor the microseismicity occurring during the period of renewed reservoir growth resulting from additional hydraulic fracturing. This is to provide a more accurate assessment of the shape and orientation of the hot dry rock reservoir than was initially obtained using only the surface seismic array.

Finally, the hot dry rock circulating system is completed by drilling the two or more production wells to intersect the reservoir near each end of the elongated reservoir region as defined by the "cloud" of microseismic event locations defining the shape of the fractured hot dry rock reservoir. All the wells would be appropriately completed with casing to the surface and then purged of drilling fluids and other water-based materials, again using gaseous carbon dioxide.

EXAMPLE II

In a constructive reduction to practice, a half-year pre-production test of the confined hot dry rock reservoir constructively created in Example I is made.

Following the reservoir creation and flow loop development phases of Example I, the hot dry rock reservoir is flow-tested for a period of about half a year to establish and verify all the necessary operating parameters for the design of an appropriate surface power plant or other heat utilization system.

The parameters that need to be measured and verified are:
(a) the geofluid production temperature;
(b) the production flow rate and the reservoir pressure drop and reservoir flow impedance, all as functions of injection and production pressure levels;
(c) the distribution of the flow impedance across the reservoir;
(d) the amount of water dissolved in the produced supercritical carbon dioxide as a function of time—and the success in methods of water removal; and
(e) the temporal variation in the rate of diffusion of the geofluid outward from the fractured hot dry rock reservoir into the rock mass surrounding the reservoir (i.e., the geofluid loss rate as a function of time).

The temporal variation in the rate of diffusion of the geofluid outward from the fractured hot dry rock reservoir is the principal measurement in establishing the rate of carbon dioxide sequestration in the rock mass surrounding the hot dry rock reservoir.

Based on the wealth of Fenton Hill hot dry rock reservoir performance data already available and allowing for a factor of three increase in the diffusively of supercritical carbon dioxide compared to water under comparable reservoir conditions of temperature and pressure (250° C. and 52 MPa), it is anticipated that the geofluid loss rate from the periphery of a ½ cubic kilometer reservoir region, at the end of 6 months of reservoir flow testing, would be about 7 pounds per second.

This closed-loop flow testing would be done by the simple expedient of wasting the produced geothermal heat to the atmosphere in an air-cooled heat exchanger. A high-pressure injection pump would be used to establish the initial level of reservoir pressurization and to maintain that level of pressurization during the establishment of circulation, but might not be needed once steady-state flow conditions with buoyant circulation are established.

During the period of flow testing under a variety of surface operating pressures, active seismic monitoring of the near-reservoir region would be maintained to determine the degree of confinement of the fractured hot dry rock reservoir and whether any reservoir leakage paths have developed. This data, in combination with the temporal variation in the rate of geofluid loss from the reservoir, are the two principal quantities needed in determining the degree of confinement of the hot dry rock reservoir.

At the end of this period of preliminary reservoir flow testing, all the data and parameters needed for designing and fabricating an optimum surface power plant are in hand and the reservoir is fully verified with respect to power production potential and longevity.

While the apparatuses, articles of manufacture, methods and compositions of this invention have been described in detail for the purpose of illustration, the inventive apparatuses, articles of manufacture, methods and compositions are not to be construed as limited thereby. This patent is intended to cover all changes and modifications within the spirit and scope thereof.

INDUSTRIAL APPLICABILITY

The invention method and apparatus can be used for production of geothermal energy from hot dry rock reservoirs using supercritical fluids. Practice of the invention also provides a means for sequestration of carbon dioxide that is produced in combustion processes or otherwise obtained such that the carbon dioxide is not released to the atmosphere to contribute to continuing global warming.

What is claimed is:

1. A method of extracting geothermal energy from an underground hot dry rock reservoir, comprising the steps of:
(a) creating an underground hot dry rock reservoir by fracturing underground hot rock with fluid carbon dioxide consisting essentially of carbon dioxide fluid in the supercritical phase or carbon dioxide fluid that is transformed into the supercritical phase by the hot dry rock;

(b) allowing the fluid to absorb heat from the hot dry rock of the reservoir and thereby increase the heat content of the fluid;

(c) removing at least a portion of the fluid having an increased heat content from the underground hot rock reservoir; and (d) extracting heat from the portion of fluid having an increased heat content.

2. The method as recited in claim 1 further comprising the steps of:

(e) reintroducing back into the reservoir at least a portion of the fluid from which heat has been extracted;

(f) allowing the reintroduced fluid to absorb heat from the hot dry rock again;

(g) removing at least a portion of the reintroduced fluid having an increased heat content from the underground hot dry rock; and (h) extracting heat from the reintroduced fluid having an increased heat content.

3. The method as recited in claim 1 wherein the creation of the hot dry rock reservoir comprises injecting the fluid into a packed off interval of an openhole wellbore and thence into a deep region of hot dry rock.

4. The method as recited in claim 1 wherein the hot dry rock reservoir is at a depth in the range of from about 1,000 feet to about 30,000 feet.

5. The method as recited in claim 1 wherein the hot dry rock of the hot dry rock reservoir has a temperature in the range from about 120° C. to about 1,000° C.

6. The method as recited in claim 5 wherein the temperature of the hot dry rock of the hot dry rock reservoir has a temperature in the range of from about 150° C. to about 500° C.

7. The method as recited in claim 1 wherein the hot dry rock of the hot rock reservoir comprises rock selected from the group consisting of igneous, metamorphic and sedimentary rock.

8. The method as recited in claim 1 wherein the fluid is injected at a pressure in the range from about 1,000 psi to about 15,000 psi.

9. The method as recited in claim 1 wherein the fluid is injected through an open wellbore for an injection period in the range from about a few hours to several months.

10. The method as recited in claim 1 wherein the fluid is injected through an open wellbore for an injection period in the range from about 1 week to about three months.

11. The method as recited in claim 1 wherein the fluid is injected at a rate in the range from about 20 to 60 kilograms per second.

12. A method of extracting geothermal energy from an underground hot dry rock reservoir, comprising the steps of:

(a) injecting fluid consisting essentially of carbon dioxide into an underground hot dry rock reservoir, the fluid carbon dioxide comprising fluid in the supercritical phase or carbon dioxide fluid that is transformed into the supercritical phase by the hot dry rock;

(b) allowing the fluid to absorb heat from the hot dry rock of the hot dry rock reservoir and thereby increase the heat content of the fluid;

(c) removing at least a portion of the fluid having an increased heat content from the underground hot dry rock reservoir; and (d) extracting heat from the portion of fluid having an increased heat content.

13. The method as recited in claim 12 wherein the fluid is injected into the underground reservoir region through at least one injection well.

14. The method as recited in claim 12 wherein the fluid is injected into the underground reservoir region through a plurality of injection wells.

15. The method as recited in claim 12 wherein the fluid is conducted from said reservoir region through at least one production well.

16. The method as recited in claim 12 wherein the fluid is conducted from the reservoir region through a plurality of production wells.

17. The method as recited in claim 12 wherein after the step of heat extraction the fluid is circulated back into the underground reservoir.

18. The method as recited in claim 12 wherein the fluid is conducted from said reservoir region by pumping and thermal siphoning.

19. The method as recited as recited in claim 12 wherein the hot dry rock reservoir comprises rocks selected from the group consisting of igneous, metamorphic and sedimentary rocks.

20. The method as recited in claim 12 wherein the temperature of the hot dry rock reservoir is in the range from about 120° C. to about 1,000° C.

21. The method as recited in claim 12 wherein the temperature of the hot dry rock reservoir is in the range from about 150° C. to about 500° C.

22. The method as recited in claim 12 wherein the hot dry rock reservoir is at a depth in the range from about 1,000 feet to about 30,000 feet.

23. The method as recited in claim 12 wherein the fluid is injected at a pressure in the range from about 1,000 psi to about 15,000 psi.

24. The method as recited in claim 12 further comprising removing water from the portion of fluid that has been removed from the reservoir.

25. The method as recited in claim 12 wherein heat is extracted from the heated fluid using a power generation system in a surface power plant.

26. The method as recited in claim 25 wherein the heated fluid is expanded directly into a turbine power generator.

27. The method as recited in claim 25 wherein the heated fluid is conducted through a heat exchanger, thereby transferring heat to a turbine power generator working fluid.

28. The method as recited in claim 27 further comprising injecting the fluid from the turbine power generator back into the underground reservoir.

29. The method as recited in claim 12 wherein substances that dissolved into the fluid from the hot rock reservoir are separated from the fluid after removing the fluid from the hot dry rock reservoir.

\* \* \* \* \*